United States Patent [19]

McDowell

[11] Patent Number: 4,478,052
[45] Date of Patent: Oct. 23, 1984

[54] FOOD STORAGE RECEPTACLE FOR USE IN AUTOMOTIVE VEHICLE

[76] Inventor: Robert A. McDowell, 1920 N. 48th Ave., Hollywood, Fla. 33021

[21] Appl. No.: 535,222

[22] Filed: Sep. 23, 1983

[51] Int. Cl.³ .............................................. B60H 3/04
[52] U.S. Cl. .......................................... 62/244; 62/457
[58] Field of Search ................. 62/244, 457, 529, 530, 62/371, 372

[56] References Cited

U.S. PATENT DOCUMENTS

| | | | |
|---|---|---|---|
| 2,902,838 | 9/1959 | Nichols | 62/244 |
| 3,505,830 | 4/1970 | Koerner | 62/244 X |
| 3,529,435 | 9/1970 | Becker | 62/244 |
| 3,850,006 | 11/1974 | Redfern et al. | 62/216 |
| 3,916,639 | 11/1975 | Atkinson | 62/239 |
| 4,258,555 | 3/1981 | Scharm et al. | 62/244 |

Primary Examiner—Lloyd L. King
Attorney, Agent, or Firm—Oltman and Flynn

[57] ABSTRACT

An insulated receptacle for holding beverage cans or other food items in the front seat compartment of an automotive vehicle. The receptacle has hangers for releasably mounting it in the vehicle, an air inlet for connection to a flexible hose leading from an air vent connected to the vehicle's air conditioning/heating system, and an air outlet for passing air from the interior of the receptacle. Can support members in the receptacle present upwardly-facing recesses for snugly receiving beverage cans.

14 Claims, 9 Drawing Figures

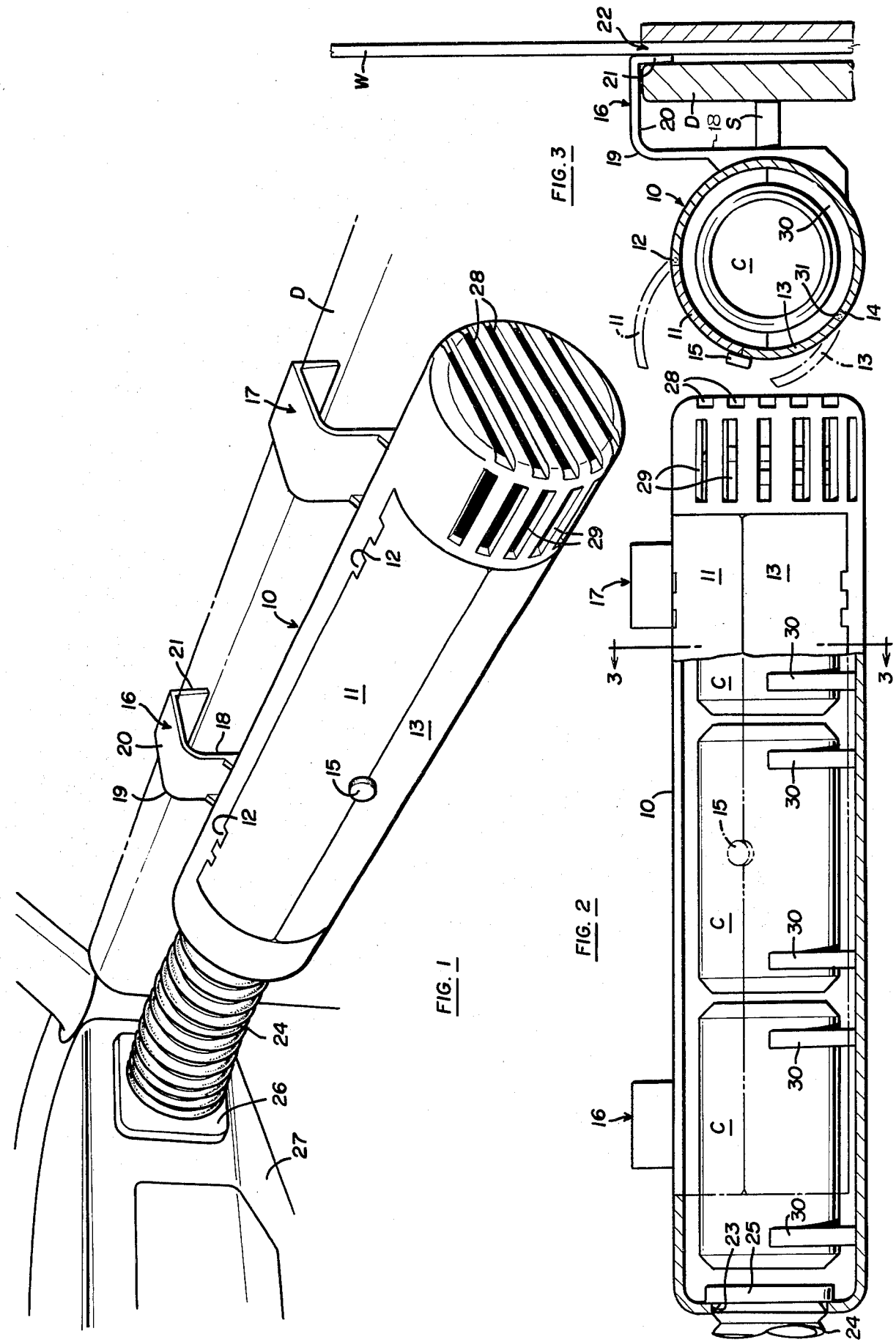

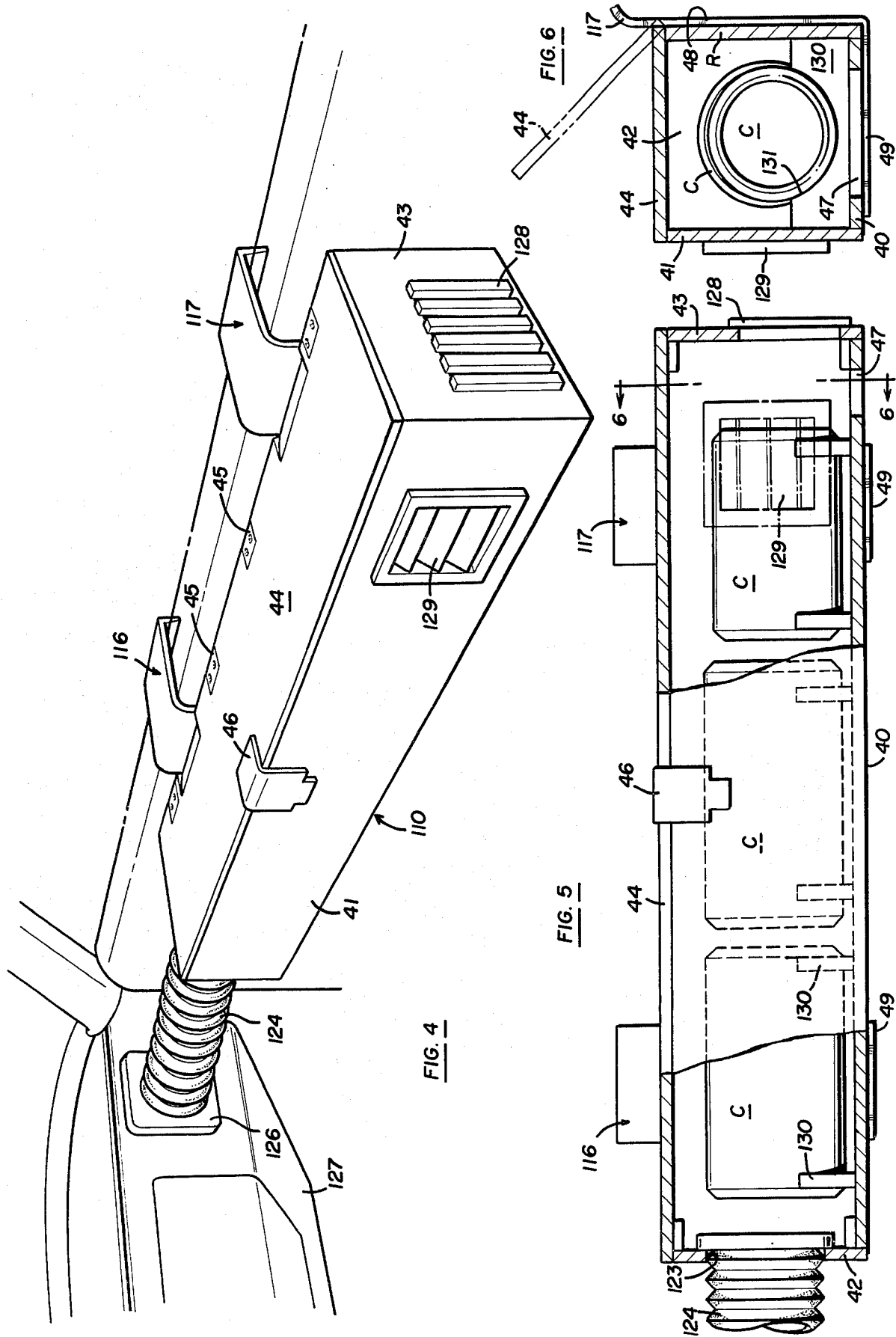

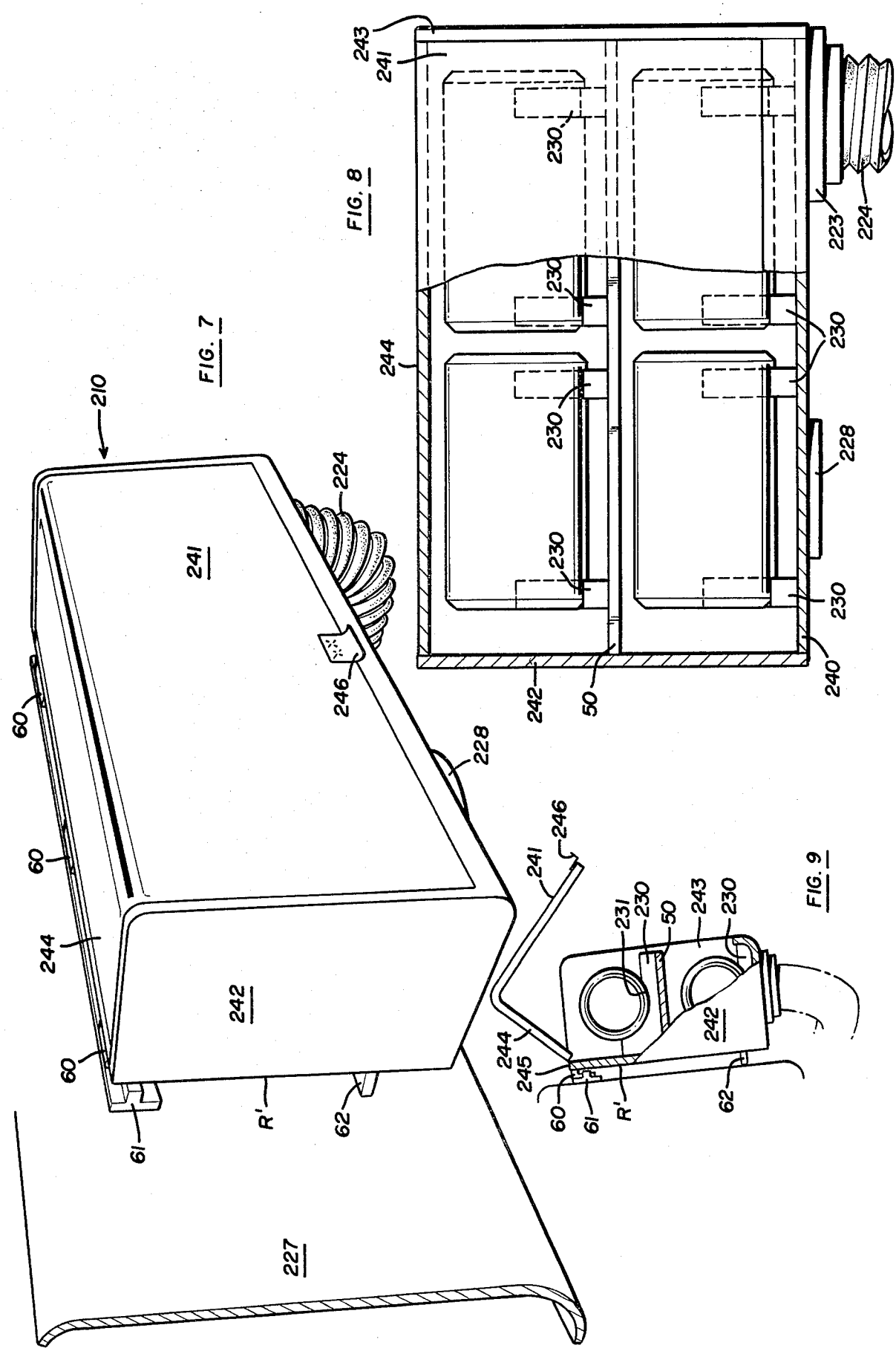

FOOD STORAGE RECEPTACLE FOR USE IN AUTOMOTIVE VEHICLE

SUMMARY OF THE INVENTION

This invention relates to a storage receptacle for beverage cans or other food items which can be connected to receive cooled air or heated air from an air vent in the passenger compartment of an automotive vehicle.

In accordance with this invention, a receptacle of suitable heat insulation material can be detachably mounted in the vehicle's passenger compartment, either on a door or on the dashboard, and connected by a flexible hose to an air vent of the vehicle's air conditioning/heating system. This puts beverage cans, for example, within easy reach of the driver or a front seat passenger. While the vehicle engine is running the beverage cans or other food items in the receptacle are cooled or heated by air supplied from the usual air conditioning/heating system in the vehicle. Inside the receptacle are can support members which are concave at the top for snugly holding beverage cans.

A principal object of this invention is to provide a novel storage receptacle to be mounted in the vicinity of the front seat of an automotive vehicle and connected to receive cooled air or heated air from an air conditioning/heating vent in the vehicle.

Another object of this invention is to provide such a receptacle which can be readily mounted in the vehicle and connected to the air vent with a minimum of difficulty.

Another object of this invention is to provide such a receptacle which has can support members on the inside for holding beverage cans in a position permitting easy removal when the receptacle is opened.

Further objects and advantages of this invention will be apparent from the following detailed description of presently preferred embodiments which are illustrated schematically in the accompanying drawings.

DESCRIPTION OF THE DRAWINGS

FIG. 1 is a perspective view of a first embodiment of the present invention mounted on right front door of a vehicle;

FIG. 2 shows this embodiment partly in front elevation and partly in longitudinal section;

FIG. 3 is a vertical cross-section taken along the line 3—3 in FIG. 2;

FIG. 4 is a perspective view of a second embodiment of this invention, also mounted on the right front door of the vehicle;

FIG. 5 shows this second embodiment partly in front elevation and partly in longitudinal section;

FIG. 6 is a vertical cross-section taken along the line 6—6 in FIG. 5;

FIG. 7 is a perspective view of a third embodiment of this invention mounted on the dashboard of a vehicle;

FIG. 8 shows this third embodiment partly in front elevation and partly in longitudinal section; and FIG. 9 shows this third embodiment partly in end elevation and partly in cross-section.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Referring to FIGS. 1-3, this embodiment of the invention has a cylindrical housing 10 with a front cover comprising an arcuate upper door 11 hinged at the top, as shown at 12, and an arcuate lower door 13 hinged at the bottom, as shown at 14 in FIG. 3. When the doors 11 and 13 are brought together, as shown in FIG. 1 and in full lines in FIG. 3, a manually engageable and disengageable latch 15 acts between the doors to hold them closed. The doors 11 and 13 which form the cover on the front of the housing 10 extend almost the entire length of the housing to provide convenient access to the beverage cans inside. The housing is made of suitable heat insulation material, such as "styrofoam" or any suitable plastic.

On the back (i.e., the side remote from the cover doors 11 and 13) the housing is formed with a pair of hangers 16 and 17, which are spaced apart along the housing and rigidly attached to it in any suitable fashion, such as by being molded integral with the housing. Referring to the hanger 16 in FIGS. 1 and 3, it has a front leg 18 extending up behind the housing and joined at its upper end through an arcuate 90 degree corner 19 to a flat top wall 20, and a rear leg 21 extending down from the top wall 20 at the opposite side from corner 19. Thus, the hanger forms an inverted channel behind the housing. As shown, rear leg 21 is tapered from top to bottom (i.e., its thickness is progressively less toward the bottom) to facilitate its insertion in the usual slot 22 in the door D through which the usual vertically retractable window W extends up. The other hanger 17 is identical to hanger 16. Preferably, as shown in FIG. 3, the hangers fit snugly over the edge of the door at the bottom of the window. Stabilizer bars S (FIG. 3) on the back of the housing below each hanger extend against the inside of the door to minimize any tendency for the housing to rattle against the door when the vehicle is in motion.

At one end the housing is formed with a circular opening 23 (FIG. 2) for receiving a flexible, longitudinally extensible and collapsible air hose 24. The hose has a flat end ring 25 which sealingly engages the inside of this end wall of the housing around the opening 24. The opposite end of hose 24 carries a fitting 26 (FIG. 1) which is attached adhesively or otherwise to the vehicle dashboard 27 around an air vent through which cold flows when the vehicle air conditioner is on.

At the opposite end the housing has air outlet openings 28 in the end wall and 29 in the front for venting air into the vehicle after it has flowed through the interior of the housing.

As shown, the housing can hold three cylindrical 12-ounce beverage cans, each about 4¾ inches high and 2½ inches in diameter. Each can is supported by a corresponding pair of can support members 30 (FIG. 2) which are spaced apart along the inside of the housing and project up from the bottom of the housing. As shown in FIG. 3, each can support member is a semi-cylindrical body which is concave at the top, presenting a cylindrical top edge 31 against which the side of the corresponding can C fits snugly. With this arrangement, the cans are supported horizontally in the housing in end-to-end relationship and are exposed to the cold air flowing from one end of the housing to the other, particularly in the upper half of the housing where there is no obstruction to the air flow.

FIGS. 4–6 show a second embodiment of the invention which is generally similar to the first except that the housing is of rectangular cross-section. Elements of this second embodiment are given the same reference numerals plus 100 as the elements of the first embodiment, and a detailed description of all these elements will not be necessary.

The housing 110 has a flat bottom wall 40, a flat vertical front wall 41, a flat vertical rear wall R, and flat vertical end walls 42 and 43. The cover of the housing is a flat top wall 44 which is pivotally attached by hinges 45 at the back to the upper end of rear wall R. The cover carries a latch 46 at its front edge for releasably holding it closed. The housing is constructed of any suitable material having the desired rigidity, strength and heat insulation properties. For example, it may be of wood with an inner liner of heat reflective metal foil.

At the end away from the vehicle dashboard 127 the housing has air outlet openings 47 in its bottom wall 40 (FIGS. 5 and 6), as well as air outlet openings 128 in its end wall 43 and air outlet openings 129 in its front wall 41 (FIG. 4).

The can support members 130 inside the housing have concave top faces 131 for snugly engaging the respectivfe cans C from below.

As shown in FIG. 6, the hangers 116 and 117 have vertical legs 48 which abut against the rear wall R of the housing and horizontal bottom legs 49 extending forward from the lower ends of the respective vertical legs 48 directly beneath the bottom wall 40 of the housing. The hangers 116 and 117 enable the housing in FIG. 4 to be suspended on the inside of the vehicle door in the same manner as the embodiment of FIGS. 1–3. A flexible hose 124 connects the air inlet opening 123 (FIG. 5) in the front end of the housing to an air vent in the dashboard 127.

FIGS. 7–9 show a third embodiment of the present invention which is mounted on the vehicle dashboard.

The housing 210 has a flat bottom wall 240, a flat vertical rear wall R', and flat vertical end walls 242 and 243. The cover of the housing is formed by a flat top wall 244 and a depending vertical front wall 241 molded integral with the top wall and extending down from the latter's front end. The cover is hingedly connected at 245 to the upper end of the rear wall R'. The cover carries a latch 246 at its lower front end for releasably holding it closed. The housing is constructed of any suitable heat insulation material of sufficient rigidity and strength.

The housing has a shelf 50 (FIGS. 8 and 9) located about midway along its height from bottom to top. This shelf supports two pairs of can support members 230, each having a concave top face 231 (FIG. 9) which extends through an arc of about 120 degrees for snugly supporting a can C from below. The shelf may have openings formed in it to facilitate the flow of cold air through the interior of the housing. The bottom wall 240 carries two similar pairs of can support members 230 of the same shape. With this arrangement the housing can hold as many as four 12 ounce beverage cans, as shown in FIG. 8.

On the back at the top the housing has three right angled hangers 60 (FIG. 9), each of which projects rearward and downward for insertion in a corresponding opening in a bracket 61 of generally T-shaped cross-section which is rigidly affixed to the vehicle dashboard 227. Toward its lower end the housing has a rearwardly projecting rigid spacer bar 62 which engages the dashboard to position the back wall R' of the housing parallel to the dashboard.

Near its right end in FIGS. 7 and 8, the housing has a bottom opening at 223 which receives an air inlet hose 224 in the manner already described for the embodiment of FIGS. 1–3. The opposite end of this hose is connected to an air vent in the vehicle which passes cold air from the air conditioner.

Near its left end the housing has a bottom opening at 228 for venting air from inside the housing into the passenger compartment of the vehicle.

On cold days the driver may have the vehicle heater on, in which case the air supplied to the interior of the housing would be hot air for warming whatever comestible product is in the housing.

From the foregoing it will be evident that the present invention may be readily installed in the passenger compartment of an automotive vehicle to take advantage of the cold air supply coming from the vehicle air conditioner or the hot air supply from its heater, providing a storage receptacle for beverage cans or other food articles which makes them conveniently accessible to the driver or a passenger.

I claim:

1. A beverage can storage receptacle for use in the passenger compartment of an automotive vehicle comprising:
    a housing having a hollow interior;
    can support members in said housing for holding individual beverage cans substantially horizontal;
    said housing having a cover which is displaceable to expose the interior of the housing for removal of the cans;
    and hanger means on the back of said housing for hanging the housing on the inside of the passenger compartment of the vehicle;
    said housing having an air inlet for connection to an air vent in the passenger compartment and having air outlet means for venting air from its interior;
    said can support members being spaced apart horizontally along said housing;
    and each of said can support members presenting an upwardly-facing recess shaped and dimensioned to snugly receive the side wall of a beverage can.

2. A receptacle according to claim 1 wherein:
    said cover is hinged to the top of said housing.

3. A receptacle according to claim 2, wherein:
    said hanger means comprises hangers spaced apart horizontally along said housing and each having an inverted channel at its upper end extending behind said housing.

4. A receptacle according to claim 3, wherein:
    said inverted channel of each hanger at its end away from the housing presents a downwardly extending leg which is tapered for insertion in the window slot in a door of the vehicle.

5. A receptacle according to claim 1, wherein:
    said cover is hinged to the top of said housing.

6. A receptacle according to claim 1, wherein:
    said hanger means comprises hangers spaced apart horizontally along said housing and each having an inverted channel at its upper end extending behind said housing.

7. A receptacle according to claim 6, wherein:

said inverted channel of each hanger at its end away from the housing presents a downwardly extending leg which is tapered for insertion in the window slot in a door of the vehicle.

8. A receptacle according to claim 7, wherein:
said can support members are spaced apart horizontally along said housing;
and each of said can support members presents an upwardly-facing recess shaped and dimensioned to snugly receive the side wall of a beverage can.

9. A receptacle according to claim 1 wherein:
said housing is horizontally elongated;
said air inlet is in one end of the housing;
and said air outlet means comprises openings in the opposite end of said housing and in the front of said housing adjacent said opposite end.

10. A receptacle according to claim 9 wherein said housing is cylindrical.

11. A receptacle according to claim 9 wherein said housing is rectangular in cross-section.

12. A receptacle according to claim 1 wherein:
said housing has a bottom wall and a shelf spaced above said bottom wall;
and certain of said can support members are on said bottom wall and others are on said shelf.

13. A receptacle according to claim 12 wherein:
said air inlet is in said bottom wall of the housing;
and said air outlet means is in said bottom wall of the housing.

14. A receptacle according to claim 12 wherein:
said hanger means are hangers which are attachable to complementary supports on the vehicle dashboard.

* * * * *